May 18, 1943. H. MEITZNER 2,319,425
LAWN MOWER
Filed June 30, 1941 3 Sheets-Sheet 2

Inventor
HAAKON MEITZNER
By E. V. Hardway
Attorney

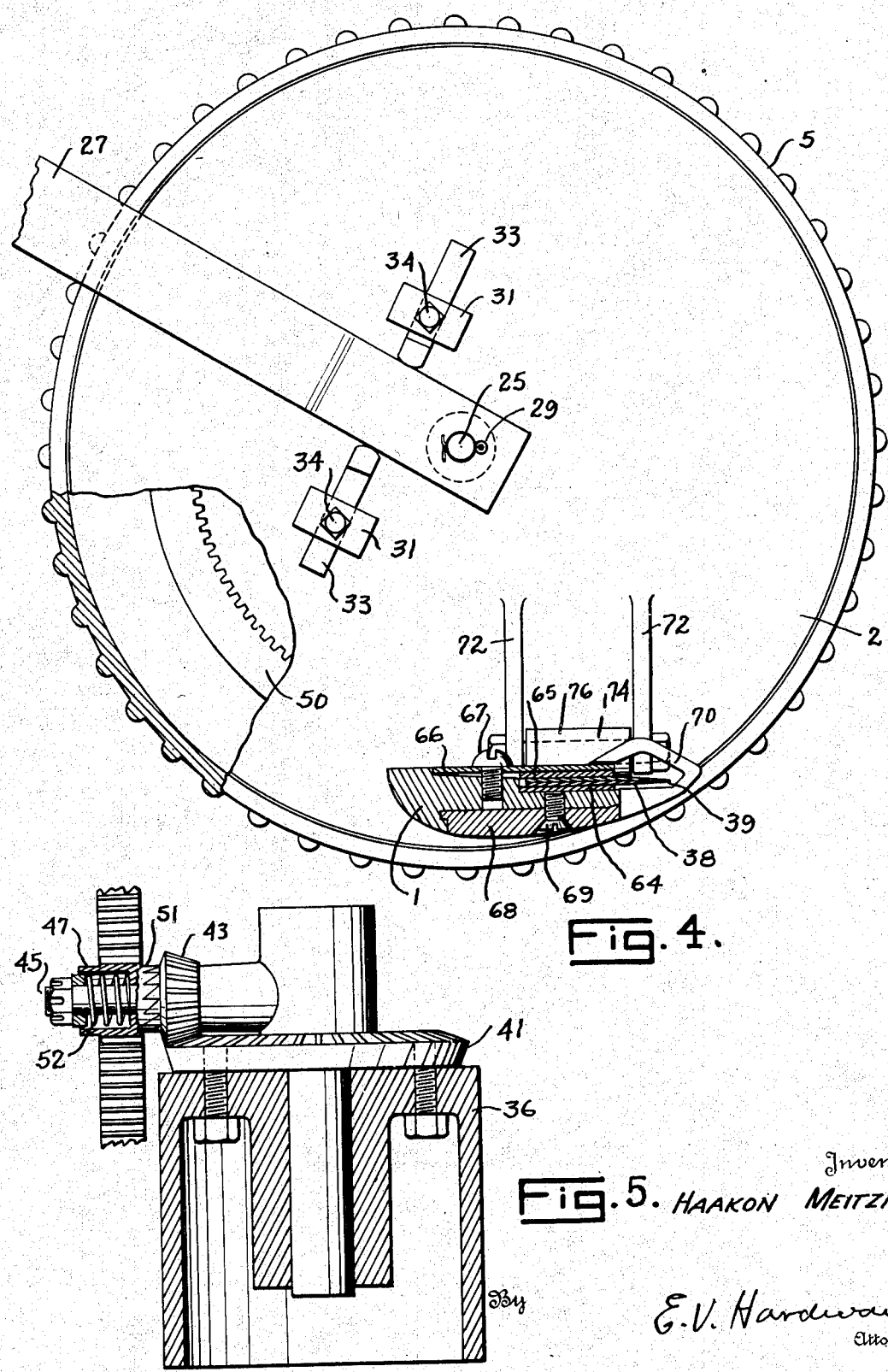

Patented May 18, 1943

2,319,425

UNITED STATES PATENT OFFICE 2,319,425

LAWN MOWER

Haakon Meitzner, Houston, Tex.

Application June 30, 1941, Serial No. 400,446

9 Claims. (Cl. 56—244)

This invention relates to a mower and has particular relation to a lawn mower.

An object of the invention is to provide a mower of the character described wherein the cutter blades are in the form of an endless band or belt with the runs of the belt arranged in adjacent relation through the cutter bar, said adjacent runs being movable in opposite directions so that the cutter blades will cooperate with shear-like effect to cut the grass as the machine is propelled along.

Another object of the invention is to provide, in a mower, means for adjusting the adjacent runs of the belt to adjust the cutter blades into proper cutting relation.

Means have also been provided for regulating the tension of the belt and for mounting the belt in a novel manner and operatively connecting the same with the ground wheels of the mower so that the belt will be driven as the mower moves forwardly but will be disconnected from the driving means upon rearward movement of the mower.

The invention also embodies novel means for housing the cutter belt.

With the above and other objects in view the invention has particular relation to certain novel features of construction, operation and arrangement of parts, an example of which is given in this specification and illustrated in the accompanying drawings, wherein:

Figure 4 shows a vertical sectional view taken on the line 4—4 of Figure 1 and shown partly broken away, and Figure 5 shows a fragmentary horizontal sectional view taken on the line 5—5 of Figure 1.

Referring now more particularly to the drawings wherein like numerals of reference designate the same parts in each of the figures, the main frame of the machine consists of the cross-bar 1 secured to the ends of which are the similar discs 2, 2 which are spaced the required distance apart and which are formed with the central hubs 3, 3.

The numerals 4, 5 designate the ground wheels of the mower which are substantially similar, differing in details only in a manner hereinafter specified.

Figure 1:
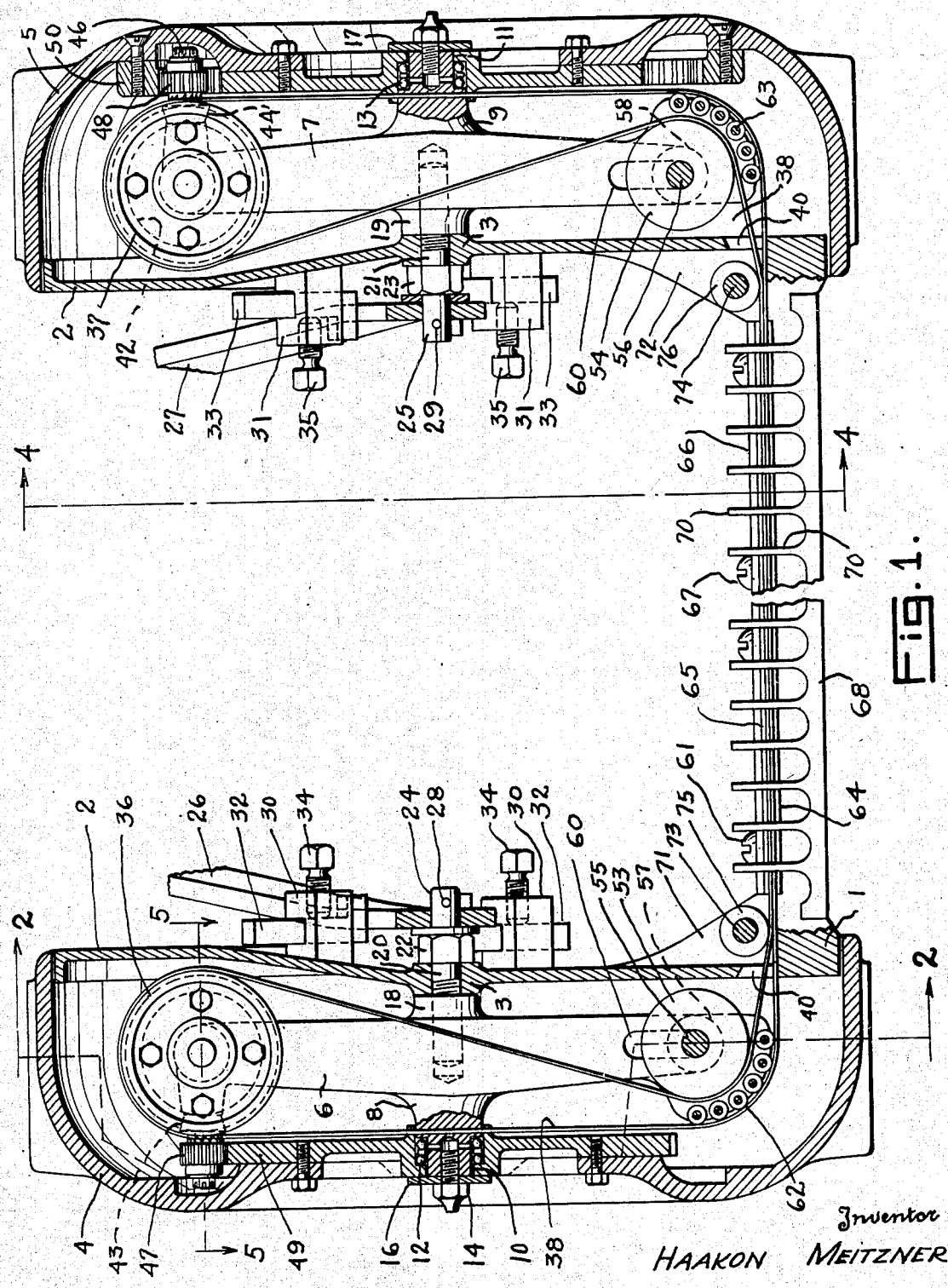
Figure 1 shows a vertical sectional view.

As will be noted from an inspection of Figure 1, these wheels are of shell-like construction, their outer sides being enclosed and their inner sides being enclosed by the circular discs 2, 2 whose margins fit closely within the corresponding margins of the wheels 4, 5.

Within the wheels and enclosed by the corresponding discs are the yokes 6, 7 having the outwardly extended spindles 8, 9, whose outer ends project through the central bearings 10, 11 of the ground wheels 4, 5. The ground wheels are mounted on anti-friction bearings 12, 13 around said spindles and these bearings may be supplied with a lubricant through grease gun connections 14, 15 of conventional construction which are screwed into the outer ends of the spindles and which clamp the respective retainer plates 16, 17 against the outer ends of the wheels to close said bearings.

The inner sides of the yokes 6, 7 have the central bosses 18, 19 in abutting relation with the corresponding discs 2, 2 and which are secured in that relation by means of the bolts 20, 21 which are fitted through the hubs 3, 3 and screwed into the yokes 6, 7 and which have the enlarged polygonal heads 22, 23 thereon which abut the outer ends of the hubs 3, 3 when the said bolts are screwed home.

The inner ends of the bolts 20, 21 are extended forming the pins 24, 25. The mower may be propelled in any preferred manner, preferably by the usual handle which has the diverging handle bars 26, 27 provided with bearings to receive the pins 24, 25, said handle bars being secured against detachment by means of the cotter keys 28, 29. The facing sides of the discs 2 have the inwardly extended bosses 30, 30 and 31, 31 arranged on opposite sides of the corresponding handle bars 26, 27, as more clearly shown in Figure 4 and adjusting bars 32, 32 and 33, 33 are fitted through bearings in said bosses and bear against the corresponding handle bars 26, 27 and are secured at any selected point of adjustment by the set screws 34, 34 and 35, 35 which are threaded through said bosses and engage said adjusting bars. Provision is thus made for adjusting the angle of the handle relative to the horizontal.

Figure 3:
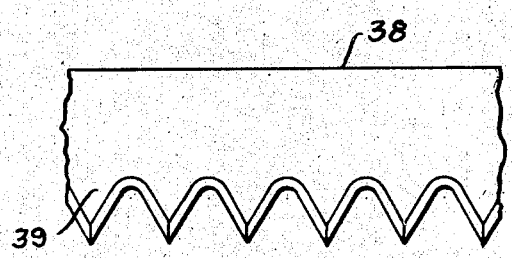
Figure 3 shows a fragmentary plan view of the endless belt on which the cutter blades are formed.

Rotatably mounted on the upper ends of the yokes 6, 7 are the drums 36, 37 around which the endless travelling belt 38 operates. This belt is formed of suitable flexible material such as steel and its forward margin is serrated forming the cutter blades 39 whose margins are inwardly bevelled as more clearly shown in Figure 3 to provide sharp cutting edges at the margins of the cutters. The belt works through openings 40, 40 in the lower portions of the discs 2, 2.

The drums 36, 37 have the bevelled gear wheels 41, 42 fixed thereon which are in mesh with, and are driven by, bevelled pinions 43, 44 which are loosely mounted on the corresponding spindles 45, 46. Also mounted on these spindles and rotatable therewith are the spur gears 47, 48, the former of which is driven by a spur gear wheel 49 fastened to the inner side of the wheel 4 and the latter of which is driven by the ring gear 50 fastened to the inner side of the ground wheel 5. It will be noted that the gear 49 is an external gear and the gear 50 is an internal gear so as to cause the drums 36, 37 to rotate in the same direction. The adjacent hubs of the gears 43, 47 and likewise the adjacent ends of the hubs of the gears 44 and 48 are formed with interengaging clutch teeth, designated generally by the numeral 51, Figure 5, which teeth are normally held in engagement by springs, such as 52 which surround the corresponding spindles 45, 46. The clutch teeth 51 are pitched so as to engage and transmit rotation to the drums 36, 37 as the machine is propelled forwardly but to disengage upon reverse movement of the machine.

The inner run of the endless belt 38 passes around the rollers 53, 54 mounted on the lower ends of the yokes 6, 7. These rollers are mounted on the corresponding spindles 55, 56 between the inner stops 57, 58 and the outer retaining nuts as 59, Figure 2. The spindles 55, 56 are extended through oblong slots 60, 60 of the yokes 6, 7 so that the rollers 53, 54 may be adjusted to regulate the tension on the endless belt 38. The spindles may be secured at any point of adjustment by suitable lock nuts as 61.

Figure 2:
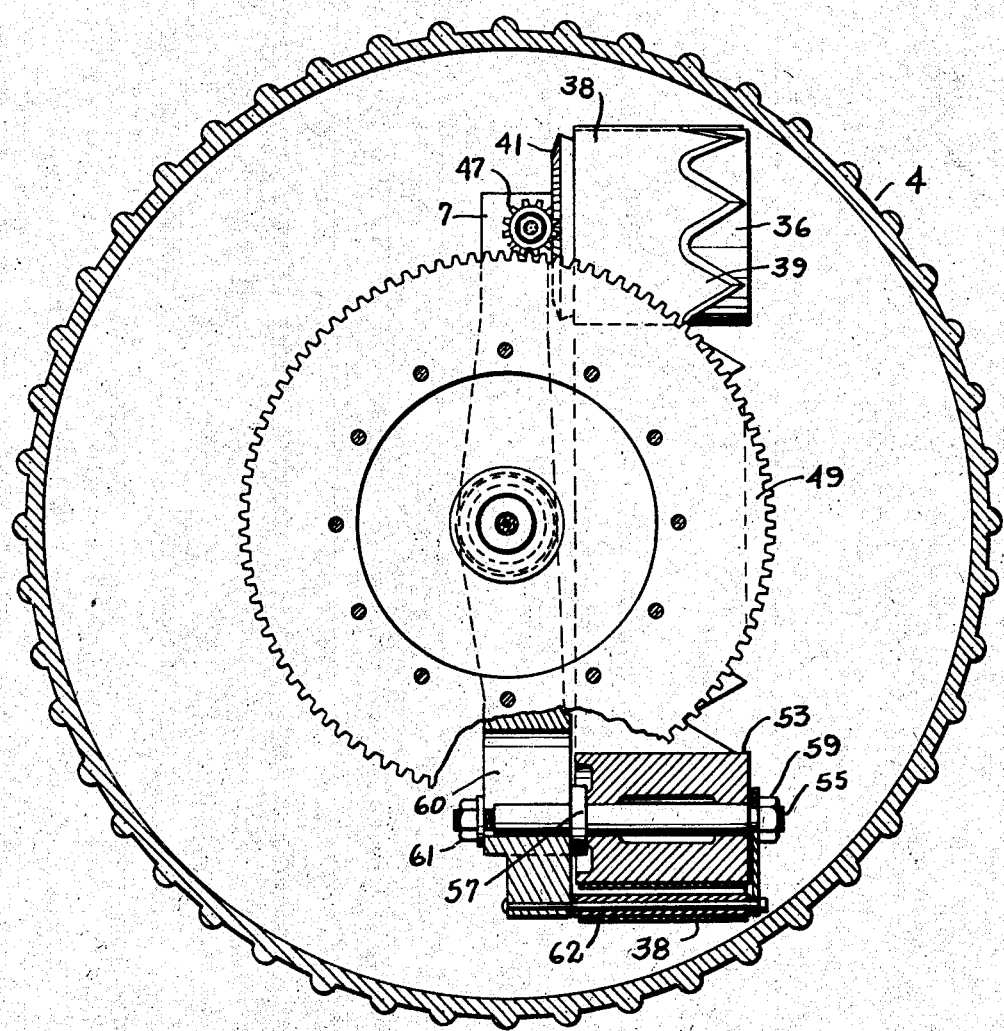
Figure 2 shows a sectional view taken on the line 2—2 of Figure 1.

The outer run of the endless belt 38 passes around the respective series of roller bearings 62, 63 suitably mounted on the lower ends of the yokes 6, 7 as more clearly shown in Figures 1 and 2. The upper side of the forward margin of the cross-bar 1 is countersunk approximately from end to end thereof and on the bottom of this countersunk portion there is a wear plate 64 over which the outer run of the belt 38 passes and spaced above the wear plate 64 there is a similar wear plate 65 beneath which the inner run of the endless belt 38 passes and overlying the wear plate 65 there is a tension plate 66 which is fastened to the crossbar 1 by tensioning screws 67 as shown in Figures 1 and 4. It will thus be noted that the endless belt 38 carrying the forwardly extended cutter blades travels through between the wear plate 64, 65 with the runs substantially in contact and travelling in opposite directions so that the cutter blades 39 will operate, with shear-like effect, upon the grass to be cut.

Countersunk into the lower side of the cross-bar 1, and extending approximately from end to end thereof there is the cutter-bar 68 which may be secured to the cross-bar by means of set screws as 69 and the forward margin of this cutter bar has the forwardly directed spaced cutter guards 70 as shown more accurately in Figures 1 and 4, which serve the usual purpose of guarding the cutter blades but which are spaced apart to penetrate into the grass to be cut and not to interfere with the operation of the blades on the grass.

On opposite sides of the openings 40 the discs 2, 2 are provided with the spaced webs 71, 71 and 72, 72 which support the longitudinal spindles 73 and 74. Rotatably mounted on these spindles are the rollers 75, 76 which bear against the inside run of the belt 38 to hold it in close contact with the outer run thereof at the opposite ends of the cutter bar.

The drawings and description are illustrative merely while the broad principle of the invention will be defined by the appended claims.

What I claim is:

1. A mowing machine comprising a frame, ground wheels mounted to rotate on the frame, an endless belt formed with marginal cutter blades, means within the wheels for mounting the belt, means within the wheels for driving the belt, means mounted partly in the wheels and partly on the frame for causing the runs of the belt to travel in adjacent relation across the frame whereby the blades will be caused to cooperate with shear-like effect.

2. A mowing machine comprising a frame, ground wheels therefor, an endless belt formed with cutter blades, means carried by the frame within the wheels on which the belt is mounted for movement, means operatively connected with the means on which the belt is mounted for driving the belt from the wheels, means for causing the runs of the belt to move in adjacent relation across the frame to effect cooperative action, with shearlike effect, of the cutter blades.

3. A mowing machine comprising a frame, ground wheels therefor, an endless belt formed with cutter blades, means within the wheels on which the belt is mounted for movement, means operatively connected with the wheels and with the belt mounting means for driving the belt from the wheels, means within the wheels for causing the runs of the belt to move in adjacent relation across the frame to effect cooperative action, with shear-like effect, of the cutter blades, means for adjusting the tension of the belt, the belt driving means for each wheel including a clutch which is disengageable upon rearward movement of the corresponding wheel.

4. A mowing machine comprising a frame, ground wheels on which the frame is mounted, an endless belt formed with cutter blades, means within the wheels on which the belt is mounted for movement, means connecting the wheels with the means on which the belt is mounted for driving the belt from the wheels, means around which the belt moves for causing the runs of the belt to move in adjacent relation across the frame to effect cooperative action, with shear-like effect, of the cutter blades and means for regulating the spacing of the adjacent runs of the belt relative to each other.

5. A mowing machine comprising a frame, ground wheels therefor, an endless belt formed with cutter blades, yokes on the frame within the wheels, drums mounted on the yokes within the wheels around which the belt operates, driving connections between the wheels and some of said drums whereby the latter are rotated from the former to drive the belt, guide means around which the belt moves and whereby the runs of the belt are caused to move in adjacent relation across the frame to effect cooperation of the blades with shear-like effect, the driving connection between each wheel and the corresponding drum including a clutch formed to disengage upon rearward rotation of the wheel.

6. A mowing machine comprising a frame composed of a cross-bar and spaced discs upstanding from the ends of the bar, shell-like ground wheels which are enclosed by said discs, yokes on the frame enclosed by the wheels driving drums mounted on the yokes within the wheels, gearing connecting the wheels with the drums and including clutches arranged to disengage upon rearward movements of the wheels, an endless belt mounted on the drums to be moved thereby, tensioning rollers over which the inner run of the belt moves, guide rollers over which the outer run of the belt moves, cutter blades on the belt, said cross-bar having a guide along which the runs of the belt travel in opposite directions with said blades in cooperative relationship.

7. A mowing machine comprising a frame composed of a cross-bar and spaced discs upstanding from the ends of the bar, shell-like ground wheels which are enclosed by said discs, yokes on the frames within the wheels driving drums mounted on the yokes within the wheels, gearing for connecting the wheels with the drums, clutches for establishing said connection upon rotation of the wheels in one direction and arranged to disengage upon rotation of the wheels in the other direction an endless belt mounted on the drums to be moved thereby, tensioning rollers over which the inner run of the belt moves, guide rollers over which the outer run of the belt moves, cutter blades on the belt, said cross-bar having a guide along which the runs of the belt travel in opposite directions with said blades in cooperative relationship and a blade guard carried by the cross-bar.

8. A mowing machine having a frame and ground wheels for supporting the frame, said frame including a transverse cutter bar, drums on the frame within the wheels, an endless belt mounted on the drums and whose runs are movable in opposite directions in the cutter bar in adjacent relationship, said belt having cooperating cutter blades and means operatively connecting the wheels and drums to cause the belt to be driven from the wheels.

9. A mowing machine having a frame and ground wheels for supporting the frame, said frame including a transverse cutter bar, rotatable belt carriers carried by the frame and enclosed by the wheels, an endless belt mounted on the carriers and whose runs are movable in opposite directions in the cutter bar in adjacent relationship, said belt having cooperating cutter blades and means connecting the wheels to belt carriers whereby the belt may be driven from the wheels, as the machine is moved forwardly and clutch means arranged to disengage said driving means upon rearward movement of the machine.

HAAKON MEITZNER.